United States Patent
Dorkel et al.

(10) Patent No.: US 10,431,019 B2
(45) Date of Patent: Oct. 1, 2019

(54) HEALTH MONITORING OF AN ACTUATOR IN A FLYING DEVICE

(71) Applicant: Liebherr-Aerospace Lindenberg GmbH, Lindenberg (DE)

(72) Inventors: Andre Dorkel, Weiler (DE); Nikolaus Dreyer, Missen (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 0 days.

(21) Appl. No.: 15/202,008

(22) Filed: Jul. 5, 2016

(65) Prior Publication Data
US 2017/0069145 A1 Mar. 9, 2017

(30) Foreign Application Priority Data

Jul. 6, 2015 (DE) .................. 10 2015 008 754

(51) Int. Cl.
| | | |
|---|---|---|
| G01M 17/00 | (2006.01) | |
| G06F 17/00 | (2019.01) | |
| G06F 11/30 | (2006.01) | |
| G05B 23/02 | (2006.01) | |
| G07C 5/08 | (2006.01) | |
| B64D 45/00 | (2006.01) | |
| G07C 5/00 | (2006.01) | |

(52) U.S. Cl.
CPC ........... G07C 5/0808 (2013.01); B64D 45/00 (2013.01); G05B 23/0254 (2013.01); G07C 5/006 (2013.01); *B64D 2045/0085* (2013.01)

(58) Field of Classification Search
None
See application file for complete search history.

(56) References Cited

U.S. PATENT DOCUMENTS

| | | | | |
|---|---|---|---|---|
| 8,346,429 | B2 * | 1/2013 | Nwadiogbu | ........... G07C 5/085 701/3 |
| 9,696,718 | B2 * | 7/2017 | Nishimura | ............. G01H 17/00 |
| 2006/0064291 | A1 * | 3/2006 | Pattipatti | ............ G05B 23/0251 703/14 |
| 2012/0025033 | A1 * | 2/2012 | Huynh | .................. B64C 13/503 244/76 R |
| 2013/0345908 | A1 * | 12/2013 | Dorr | .................. G05B 23/0235 701/4 |
| 2014/0058709 | A1 * | 2/2014 | Machado Viana | .. G01M 5/0033 703/2 |

FOREIGN PATENT DOCUMENTS

| | | |
|---|---|---|
| DE | 10 2011 008 561 A1 | 7/2012 |
| EP | 1 815 224 A1 | 8/2007 |
| WO | 2006/053433 A1 | 5/2006 |

* cited by examiner

*Primary Examiner* — Adam D Tissot
(74) *Attorney, Agent, or Firm* — Dilworth & Barrese, LLP (57) ABSTRACT

The present invention relates to health monitoring of an actuator in a flying device. The same comprises a processor unit for processing data and for operating a system model of the actuator 30, at least one sensor 151, 152, 153, 154, 155, 156 for detecting a correcting variable of the actuator 30 and a memory unit 54 on which characteristic data on the actuator 30 are deposited. The processor unit is designed to carry out health monitoring on the basis of the system model with reference to the correcting variable of the actuator 30 and the characteristic data of the memory unit 54. Advantageously, the processor unit is identical to the processor unit of an electronic control system 50 of the actuator 30.

17 Claims, 7 Drawing Sheets

HEALTH MONITORING OF AN ACTUATOR IN A FLYING DEVICE

BACKGROUND OF THE INVENTION

The present invention relates to an apparatus for status monitoring of an actuator in a flying device and a corresponding method therefor.

It is the objective of status monitoring of components in a flying device, in English often also referred to as health monitoring, to at any time obtain information concerning the structural integrity, the remaining service life or further safety-related information on the component. It is of fundamental interest to be able to predict the failure of a component in a flying device, in order to be able to take countermeasures before the occurrence of the damage. It is the objective of health monitoring to obtain the current status of the monitored systems, for example of an actuator, in order to coordinate maintenance tasks for the flying device and to prevent the occurrence of safety-critical faults.

Conventional health monitoring methods in the field of aviation relate to the airframe or to the structural integrity of a landing gear. The methods for monitoring structural components as used here, which are based on fracture mechanics, have been examined in detail in the prior art and presently constitute the standard practice in health monitoring of an airframe and a landing gear. It should be noted that the design of the elements monitored here, such as for example the airframe, is effected in a fault-tolerant way. Upon occurrence of a crack in an airframe, the propagation of this crack first is monitored and subsequently damage-limiting measures are carried out.

From EP 1815224 A1 health monitoring for an aircraft landing gear is known. Like in the prior art discussed above, health monitoring mostly relates to the structural integrity of large components.

For determining the structural integrity of large components, the vibration behavior of the components generally is measured and the measurement data obtained are transformed into the frequency range. By means of a filter, in the optimal case by means of a matched filter or a Kalman filter, a vibration behavior subsequently is searched which is typical for a damaged or structurally weakened component. For this targeted filtering operation it is however necessary to know how the basic shape of the signal to be searched in the frequency range should look like, so that the filter matched thereto can detect the signal shape sought for. This knowledge only is obtained by a multitude of non-destructive and destruction-bound test series of the aircraft components to be examined. The operation experience of similar components and the operation experience of the actual component additionally contribute decisively to these extensive data. Hence it is necessary that the component to be examined is available long enough in advance, so that sufficient time is left to carry out the test series.

As shown, the database for such method is very large, so that the memory capacity required therefor is immense. In addition, the memory capacity required is additionally increased by the necessary real-time recording of a multitude of sensors (for example vibration sensors) not defined further. The expenditure for the communication between the data acquisition at the sensor and a memory unit also is considerable, so that an increased susceptibility to malfunctions and failures beside additional costs of examination, acquisition, operation and maintenance leads to a reduction of the overall safety and/or to a reduction of the system availability.

As mentioned already, it is disadvantageous in the known prior art that prior to health monitoring a particularly large database expensive to generate must be created, as only in this way the signal shape of an error or an error occurring soon can be detected. It therefore would be wrong to transfer the application of the conventionally used system to less relevant components of a flying device. This would lead to a strong increase of the costs of an aircraft development or the development of a component of a flying device and at the same time increase the weight of the flying device, as the necessary components for conventional health monitoring would have to be incorporated in addition.

SUMMARY OF THE INVENTION

It is the objective of the present invention to provide health monitoring for a physical actuating unit, such as an actuator for a flying device, which overcomes the disadvantages set forth above. The subject-matter of the invention also is a method for carrying out health monitoring.

A field of use for health monitoring according to the invention for example is the primary flight control of a flying device, i.e. elevator, aileron, rudder, roll spoiler, ground spoiler, main rotor adjustment and/or tail rotor adjustment. Furthermore, the invention can be used in the high-lift systems for the landing flaps. A further, additional field of use of the present invention is the actuation of a horizontal stabilizer for trimming, the adjustment of air inlets in air conditioners or engines, the control of tank nozzles, the actuation of cargo doors and/or other actuation, communication and power electronic systems.

The present invention is implemented by an apparatus for health monitoring of an actuator in a flying device, which comprises a processor unit for processing data and for operating a system model of the actuator, at least one sensor for detecting a correcting variable of the actuator, and a memory unit on which characteristic data on the actuator are deposited. Furthermore, the processor unit is designed to carry out health monitoring on the basis of the system model with reference to the correcting variable of the actuator and the characteristic data of the memory unit.

In an actuator, the combination of a system model with reference to a correcting variable of the actuator detected by a sensor and the characteristic data deposited in the memory unit provides for a simple determination of the actually remaining service life, the forthcoming maintenance effort or the immediate measures to be taken for pilots, flight attendants, maintenance personnel, airline and/or approval authority.

As already stated above, an actuator is a physical actuation system which is designed to perform different functions in a flying device. For example, an actuator is in use in the primary flight control, e.g. when varying an elevator or when positioning a high-lift system, e.g. slats or landing flaps. A system model of the actuator can be an observer (e.g. Luneburg), a filter (e.g. Kalman) or a simulation model (e.g. Simulink), which describes or calculates the behavior of the actuator under various circumstances. It is clear that this system model can be operated virtually by means of the processor unit.

The correcting variable of the actuator is supplied by a sensor. This sensor can be e.g. an oil temperature sensor, an oil pressure sensor, an oil quality sensor, a vibration sensor, a structure-borne sound sensor or another sensor not specified in more detail. The characteristic data which are deposited in the memory unit describe typical structural features and limit values of the actuator, which preferably were obtained during the design phase of the actuator.

By combining the findings from the system model, the existing signal from a sensor (correcting variable) and the characteristic data, the health monitoring system achieves a particularly effective health monitoring which can do without any specific prior knowledge concerning the actual aging of the actuator.

Advantageously, the health monitoring concept essentially consists of measurement samples of the control and the classical monitoring, simulation models available from the process of the device approval, publicly available material data, strength verifications available from the device approval, and safety and reliability analyses likewise known from the device approval.

Since these constituents are prepared independent of the actual health monitoring and are not especially prepared for the same, the additional expenditure of the health monitoring according to the invention merely consists of the correct combination and matching of these individual elements. The health monitoring according to the invention hence provides for a simple determination of the actually remaining service life, the forthcoming maintenance effort or the immediate measures to be taken with regard to the status of the actuator without the detailed test series especially necessary therefor in the prior art.

According to another advantageous feature of the invention the processor unit for carrying out health monitoring is the processor unit of an electronic control system of the actuator. It furthermore is designed to perform the control of the actuator. This means that beside health monitoring the processor unit at the same time performs the control of the actuator.

In this configuration it is advantageous that at a certain status of the health monitoring system, which requires an intervention of an electronic control system, the reaction time for executing the required control is particularly short. This is due to the circumstance that the processor unit of the electronic control system of the actuator at the same time is the processor unit for carrying out health monitoring. A further advantage of this method consists in that no further component is necessary for carrying out health monitoring. Due to this feature, the health monitoring system also can be fed directly by signals from the control inherent to the drive and can also fall back on signals from the communication with superordinate computers (flight computers or maintenance computers) or actuators connected in parallel, without providing any additional components. It therefore is regarded as advantageous to carry out the algorithm of health monitoring with the processor unit, which also is the processor unit of the electronic control system of the actuator.

Accordingly, the processor unit preferably is designed to receive signals from a separate control unit for driving the actuator, from a communication with a superordinate computer, such as a flight computer or a maintenance computer, and/or an actuator connected in parallel.

According to another advantageous modification of the invention, the characteristic data deposited on the memory unit are data of strength, safety and/or reliability analyses of the actuator. These data preferably are known from the design phase of the actuator. They were not created especially with regard to health monitoring. The characteristic data accordingly can only consist of data which have not be generated especially for the purpose of health monitoring. For generating the characteristic data it therefore is not necessary to carry out a plurality of non-destructive and destruction-bound test series, as it is conventionally necessary in health monitoring systems of components in flying devices.

Furthermore advantageously, the processor unit is designed to carry out health monitoring with the aim to analyze the existing data with regard to an operating condition and an operational safety of the actuator, and preferably furthermore determine the demand of maintenance measures, servicing measures, component replacement and/or device replacement. The processor unit also is designed to forward corresponding messages to superordinate instances, the receiver of which can be different depending on the urgency of an action to be executed. Depending on the determined actually remaining service life, an immediate measure can be expedient for the flying device operator, a flying device attendant, for maintenance personnel, an airline and/or an approval authority.

Furthermore preferably, the processor unit is designed to tap at least one real-time signal for controlling an actuator or for detecting a correcting variable of an actuator and convert the same into a particular number of characteristic quantities, wherein preferably the number of the data of the real-time signal is greater than the number of the data of the characteristic quantities. In addition, the processor unit is designed to deposit the characteristic quantities into the memory unit for subsequent forwarding, further processing and/or evaluation.

The processor unit hence is designed to tap a real-time signal and to extract or calculate one or more characteristic quantities from this real-time signal. The data of the real-time signal are reduced towards the data of the characteristic quantities. This preprocessing to obtain the characteristic quantities from the real-time signal subsequently is stored in the memory unit for a succeeding forwarding, further processing and/or evaluation. Preferably, the memory unit is a non-erasable memory, furthermore preferably a very small non-erasable memory.

As a further advantageous development of the invention it is proposed that the memory unit at the same time also is a memory unit for an electronic control system of the actuator. A separate memory unit for health monitoring thereby becomes superfluous, so that the total number of the components for carrying out the health monitoring according to the invention is reduced further.

Advantageously, reference values for the characteristic quantities are deposited on the memory unit, wherein the processor unit furthermore is designed to compare one of the characteristic quantities with its associated reference value. Preferably, the reference values are generated in the course of an approval process of the actuator, so that especially for health monitoring no test series are necessary.

By comparing the reference values deposited on the memory unit with the characteristic quantities extracted from the real-time signal, a current operating condition of the actuator and the deviation of the actuator from a normal range can be detected in a simple way. As in an advantageous embodiment the reference values also are obtained in the course of the approval process of the actuator, there is no additional expenditure for generating these data.

Advantageously, the processor unit is designed to carry out health monitoring such that a conclusion as to the remaining service life and the status of the actuator is possible.

As already explained above in detail, this possibility to draw conclusions results from the interaction of the system model, an existing signal of a correcting variable and the characteristic data of the actuator.

Due to the prediction of the remaining service life and the assessment of the status of the actuator, the maintenance and exchange intervals normally chosen very conservatively can be increased or be coupled to a particular detected status.

Advantageously, the apparatus according to the invention is designed such that conclusions from health monitoring are not to be transmitted in real time to a superordinate instance, such as a maintenance computer or the flying device personnel, so that existing interfaces of an electronic control system of the actuator can be utilized to transmit information.

Special communication lines necessary only for health monitoring thus can be omitted.

In addition it can be advantageous for the apparatus according to the invention when the same furthermore comprises at least one additional sensor which generates data especially for health monitoring, wherein the at least one additional sensor preferably is a structure-borne sound sensor, a vibration sensor, an oil pressure sensor, an oil quality sensor and/or an oil temperature sensor.

It furthermore is advantageous when the energy supply of the at least one additional sensor is effected by the conversion of device vibrations and/or of heat.

The arrangement of such additional sensor thereby can be realized particularly easily, as in the case of a wireless communication with the processor unit no wire-bound connections are necessary for the communication or energy supply.

The invention also relates to a method for health monitoring of an actuator in a flying device with an apparatus according to any of the embodiments described above, wherein the method comprises the following steps: tapping of correcting variables, reference variables and/or status variables from the control or regulation of a drive controller of the actuator, reduction of correcting variables, reference variables and/or status variables to characteristic quantities for damage, fatigue and/or wear analyses, use of these characteristic quantities for determining the status of the actuator, and deriving a required maintenance and/or servicing action from the determined status of the actuator.

Preferably, the damage, fatigue and/or wear analysis is carried out with reference to reference data by means of reference data of the respective analysis. These reference data are chosen in dependence on the status variables of the environment.

Preferably, one or more of the steps are carried out outside the apparatus, for example in a flight computer or a maintenance computer of the flying device.

One unit also can execute a method step of several actuators.

According to another modification of the invention the method furthermore comprises health monitoring of the entire flight control around a flight axis or direction of movement in longitudinal axis, transverse axis and/or vertical axis.

BRIEF DESCRIPTION OF THE DRAWINGS

The present invention will be explained in detail below with reference to exemplary embodiments illustrated in the Figures, in which.

DESCRIPTION OF THE PREFERRED EMBODIMENTS

Figure 1:
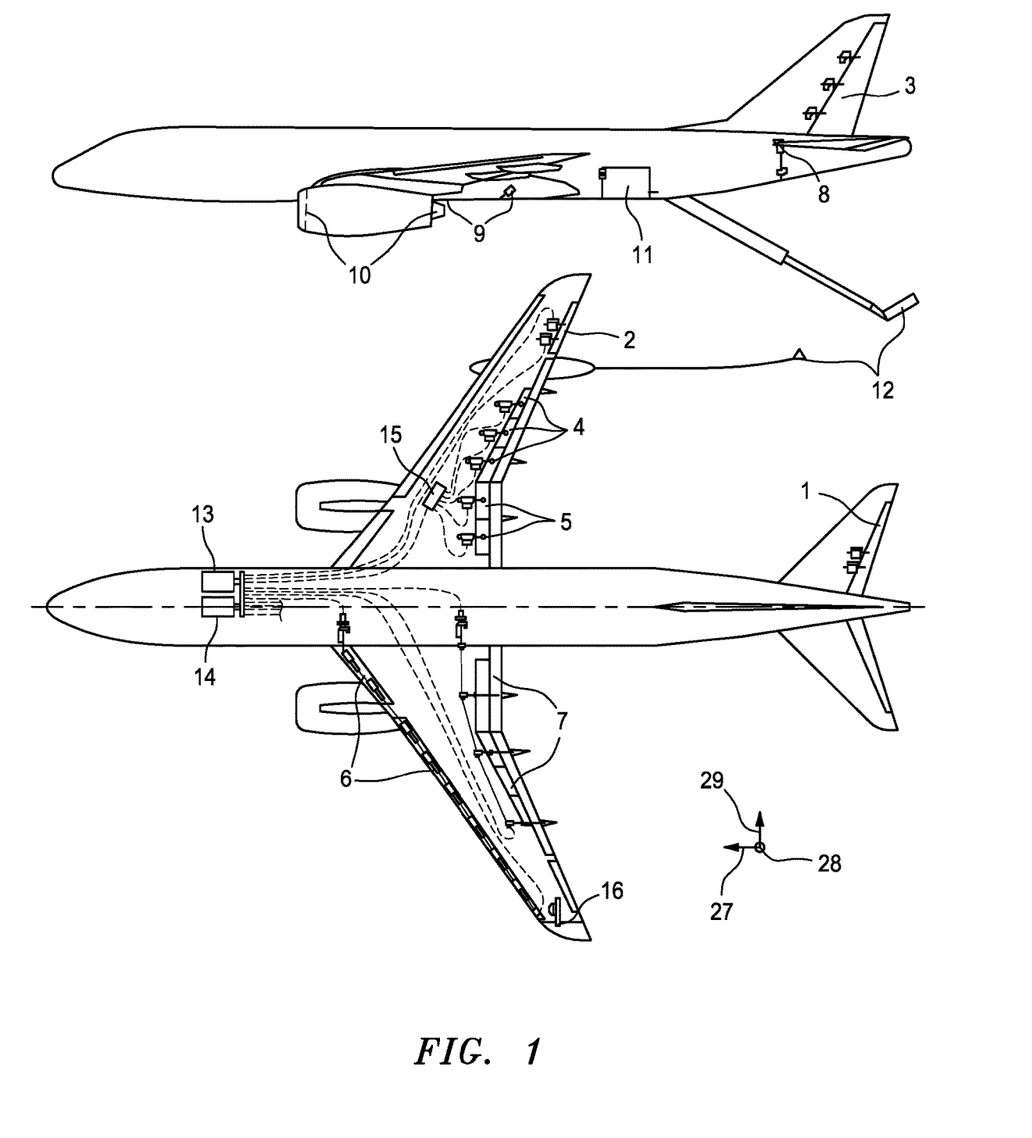
FIG. 1: shows an overview representation of the actuators to be monitored in an aircraft and their cross-linkage.

FIG. 1 shows an aircraft in a side view and in a view from above, in which the various actuators (1 to 12) and their cross-linkage with a flight computer 13 and/or a maintenance computer 14 are illustrated. In the side view of the aircraft a plurality of different actuators are provided with reference numerals. There can be seen the air inlet and the air outlet 10 at the aircraft engine, ram air valves 9 of the air conditioning system, a cargo door 11 with lock, a tank or refueling device 12, a a horizontal stabilizer trim 8 and the rudder 3.

In the view of the aircraft arranged thereunder, in which one looks down onto the aircraft from above, further actuators are provided with reference numerals. There can also be seen exemplary connections of the individual actuators to the flight computer 13. For reasons of clarity, the connections of the actuators to the maintenance computer 14 to be provided optionally are not realized completely. There is shown for example the power supply module 15, an actuator at the slat 6, a base spoiler 5, a multifunction spoiler 4, the aileron 2, the landing flaps 7, a wing folding mechanism 16 with lock and the elevator 1. For better orientation a definition of the axes is indicated in the lower right region of FIG. 1. The arrow designated with the reference numeral 27 describes the course of the longitudinal axis, the arrow designated with the reference numeral 29 describes the course of the transverse axis, and the arrow extending vertically to the longitudinal and transverse axis, which is provided with the reference numeral 28, describes the vertical axis for the lower region of the diagram.

With reference to the representation in FIG. 1 it hence can be seen that there is a multitude of different actuators in an aircraft. The same can have different effects on the stability and the flight characteristics of an aircraft and be used within a large range, which extends from safety-relevant to less safety-relevant functions.

Figure 2:
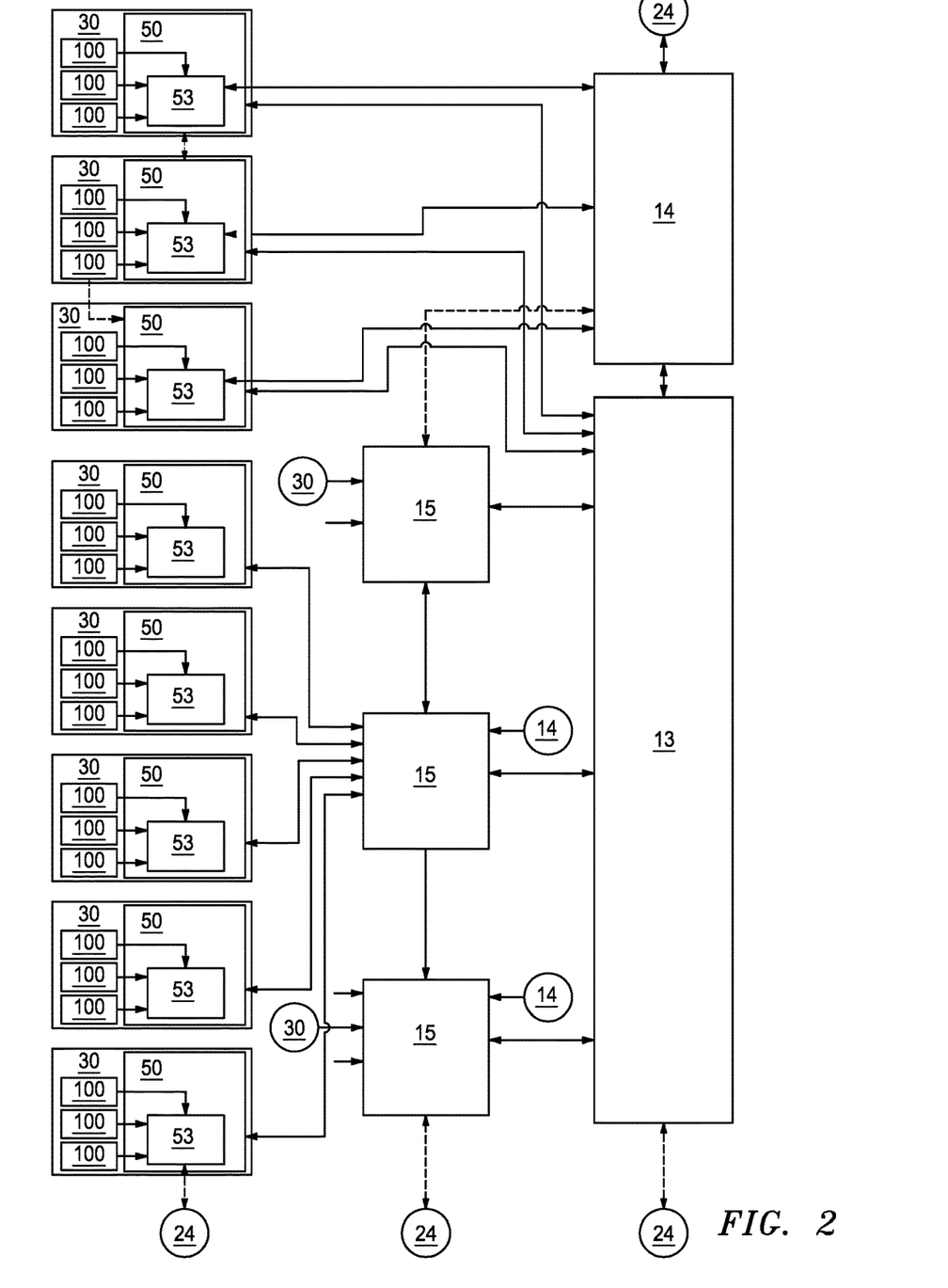
FIG. 2: shows a system architecture of the health monitoring of actuators in the aircraft.

FIG. 2 shows a system architecture in the health monitoring of actuators 30 in the aircraft. The Figure can roughly be divided into three portions, so that the same has a left, a middle and a right region. Accordingly, in the left region various actuators 30 are disclosed, which can communicate with a flight computer 13 and/or a maintenance computer 14 either directly or via a power supply module 15 which is arranged in the middle region of the Figure. The flight computer 13 or the maintenance computer 14 is arranged in the right region of the Figure. The basic construction of the plurality of actuators 30 shown in the left region of the Figure does not or only to a small extent differ in its main components.

It can be seen that each actuator 30 includes a sensor system 100 which communicates with an electronic control system 50 or with the health monitoring system 53 installed thereon.

The communication of the actuator 30 can be effected directly with the maintenance computer 14, the flight computer 13 or a power supply module 15 interposed between the flight computer 13 and/or the maintenance computer 14. In addition, a direct communication of individual actuators among each other, as this is shown for example in the upper left region of the Figure, also is possible. Furthermore, the flight computer 13, the maintenance computer 14 as well as the power supply module 15 and the actuator 30 comprise an interface 24 for the access to and tapping of data of the respective unit. Useful actuators include all physical actuating units presented with respect to FIG. 1. In addition, however, it is also clear to the skilled person that there is a multitude of further actuators in a flying device, which are suitable for the use of the invention and are also comprised by the same.

Figure 3:
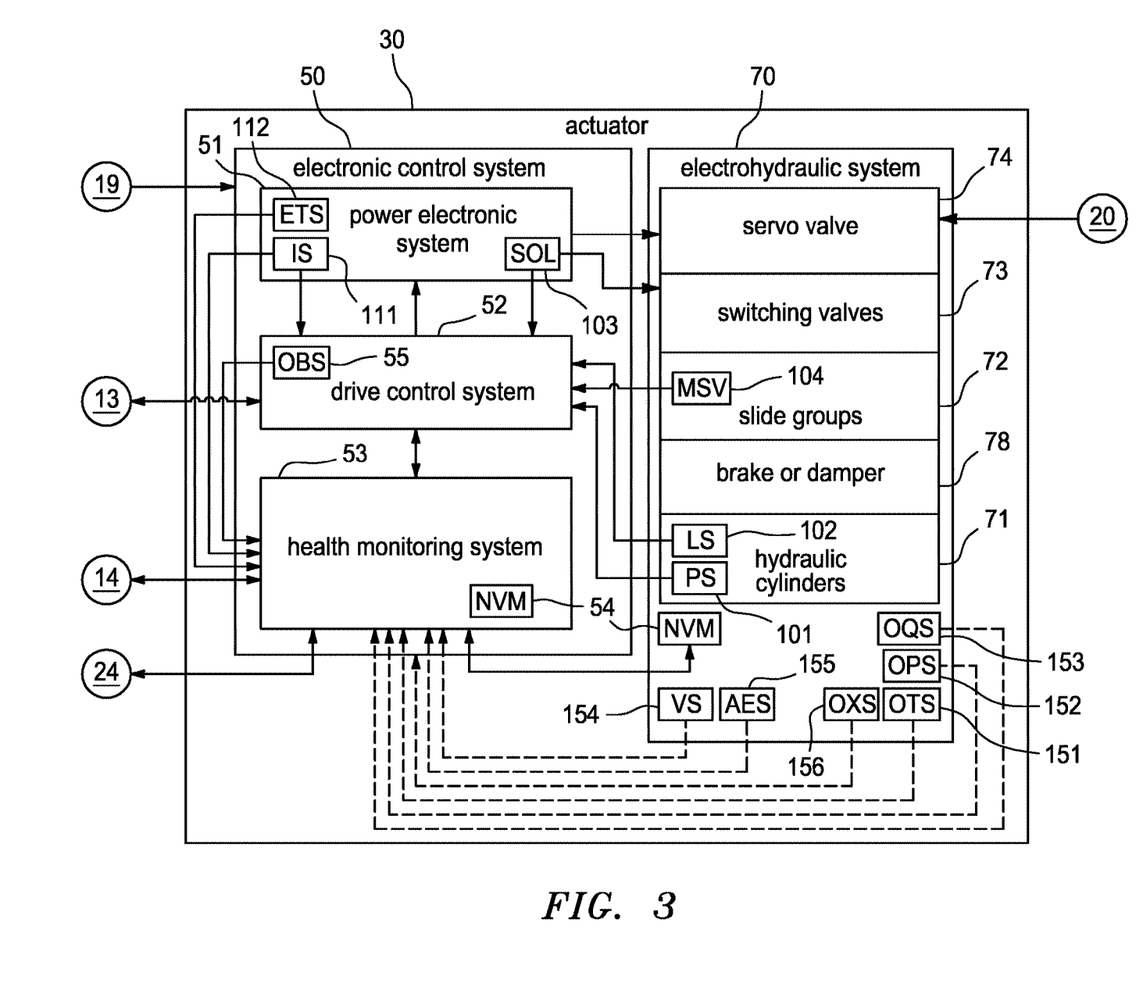
FIG. 3: shows the health monitoring interlaces to a servo valve-controlled actuator (EHSA)

FIG. 3 shows an apparatus according to the invention for health monitoring of an actuator with reference to an example of an electrohydraulic servo valve with a corresponding electronic control system and a corresponding sensor system.

The actuator 30 is connected with a hydraulic supply system 20, a power supply system 19, the flight computer 13, the maintenance computer 14, and with an interface 24 for the access to and tapping of data. Furthermore, the actuator 30 comprises an electronic control system 50 and an electrohydraulic system 70.

The electronic control system 50 furthermore comprises a power electronic system, a drive control system 52 of the actuator, and a health monitoring system 53. The power electronic system 51 includes a temperature sensor 112 of the electronic system, an output current sensor 111 and a feedback unit 103 of the switching valves. In addition, the power electronic system 51 receives signals from the drive control system 52.

The drive control system 52 receives signals of the output current sensors 111 of the power electronic system 51 and data of the feedback device 103 of the switching valves, and the feedback of the slide groups 104. In addition, the drive control system receives control variables of a hydraulic cylinder 71 from a position sensor 101 of the actuator and a load sensor 102.

Furthermore, the drive control system 52 is connected with the health monitoring system 53 via a bidirectional communication line.

The health monitoring system 53 comprises a memory unit 54, which preferably is configured as non-erasable memory, and receives a multitude of signals of the power electronic system 51, the drive control system 52 and the electrohydraulic system 70. The health monitoring system 53 receives a signal of the temperature sensors 112 of the electronic system, a signal of the output current sensors 111, the status variables 55 of the control unit as well as a multitude of sensor signals of the electrohydraulic system 70.

It can be seen that the health monitoring system 53 is embedded into the electronic control system 50. The electrohydraulic system 70 receives signals from the power electronic system 51 for converting the corresponding default values. The hydraulic system 70 comprises an oil quality sensor 153, an oil pressure sensor 152, an oil temperature sensor 151, further sensors 156, a structure-borne sound sensor 155, and a vibration sensor 154. In addition, the hydraulic system 70 furthermore includes a memory unit 54 which includes a bidirectional communication connection with the health monitoring system 53. In addition, the hydraulic system 70 comprises a servo valve 74, a switching valve 73, a slide group 72 with a feedback device 104 of the slide group, a brake 78 and a hydraulic cylinder 71 which comprises a position sensor 101 and a load sensor 102.

It can be seen that health monitoring can be executed on the basis of the system model of the actuator to be monitored with reference to a correcting variable of the actuator 30 and data deposited in the memory unit 54.

Figure 4:
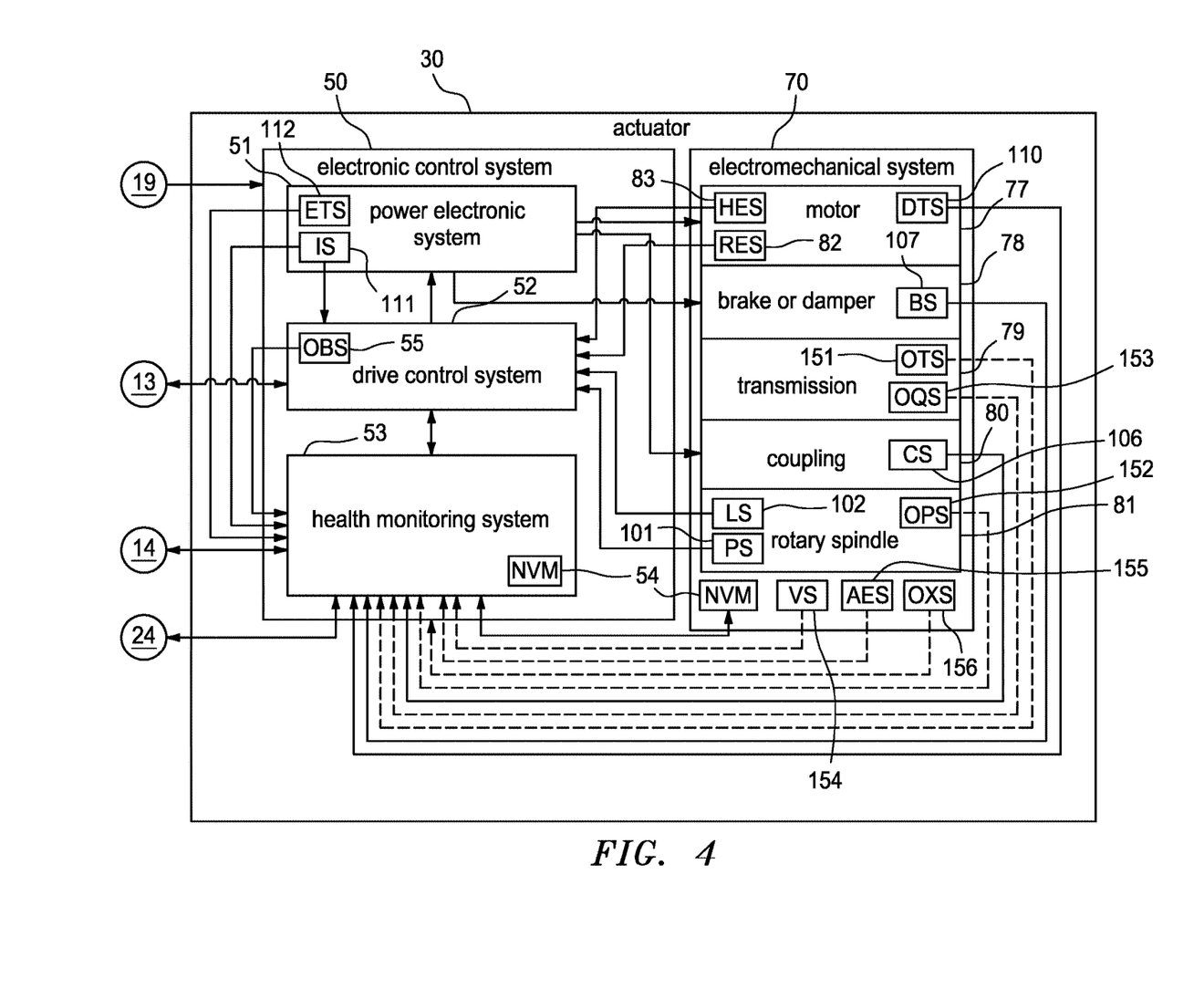
FIG. 4: shows the health monitoring interfaces to a linear electromechanical actuator.

FIG. 4 shows a schematic diagram of health monitoring of a linear electromechanical actuator whose basic construction is very similar to the actuator 30 described in FIG. 3. Therefore, merely elements differing therefrom will be described in detail below. The actuator 30 now comprises an electronic control system 50 and an electromechanical system 70. The electromechanical system 70 comprises a motor 77, a brake 78, a transmission 79, a coupling 80 and a rotary spindle 81. In addition, the electromechanical system 70 includes a vibration sensor 154 and a structure-borne sound sensor 155 beside further sensors 156. Moreover, the motor 77 includes a temperature sensor 110, the brake, a feedback device 107, the transmission, an oil temperature sensor 151 and an oil quality sensor 153, the coupling 80, a feedback device 106 and the rotary spindle and an oil pressure sensor 152, wherein the output values of the above-mentioned sensors 110, 107, 151, 153, 106, 152 all are supplied to a health monitoring system 53 in the electronic control system 50.

Figure 5:
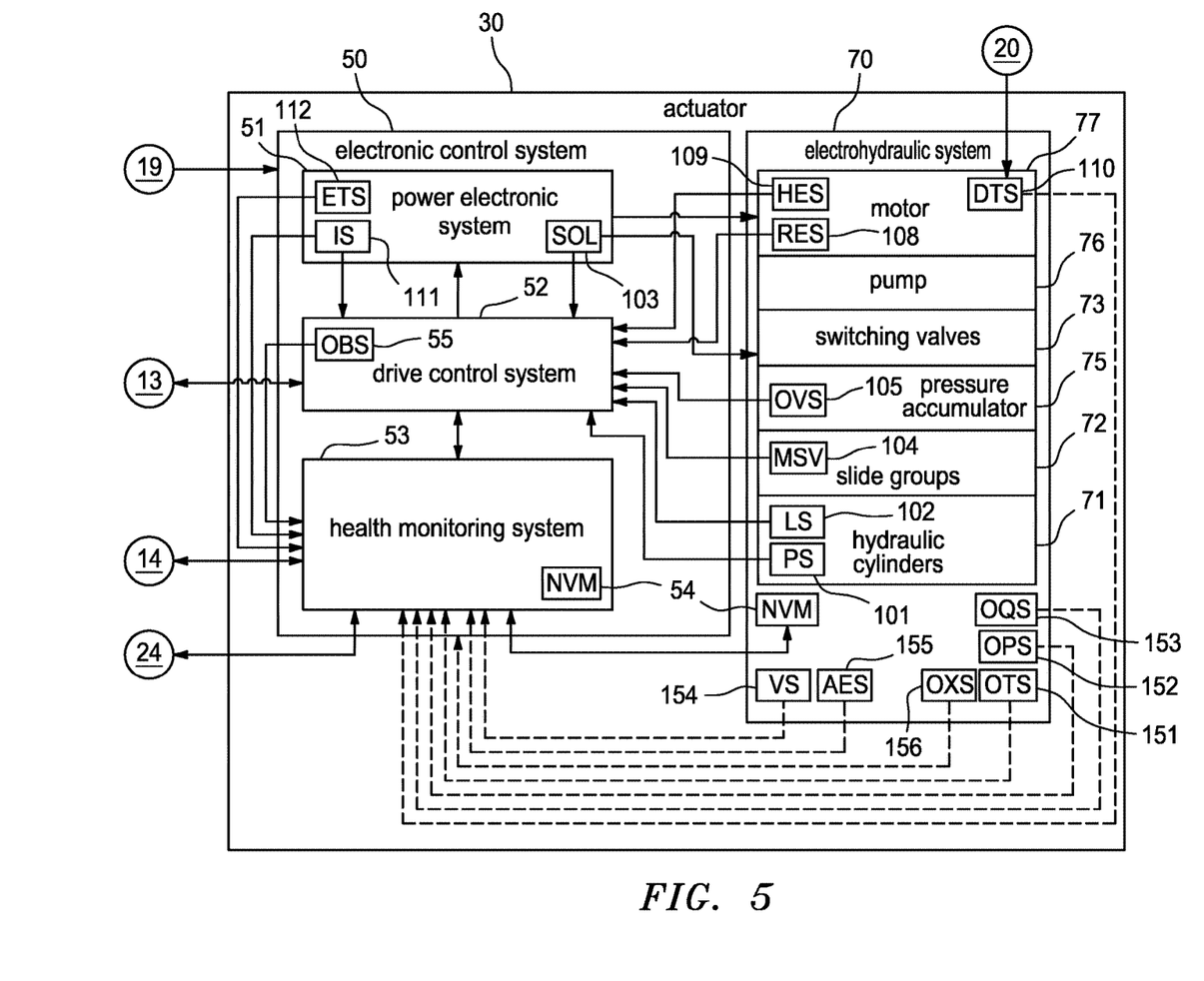
FIG. 5: shows the health monitoring interfaces of an electrohydrostatic actuator (EHA)

FIG. 5 shows a schematic diagram of health monitoring of an electrohydrostatic actuator (EHA). The same likewise does not differ in the basic construction of the electronic control system 50 and its components of the power electronic system 51, the drive control system 55 and the health monitoring system 53. Merely the type of sensor data supplied to the health monitoring system changes due to the different type of actuator. The electrohydraulic system 70 comprises a motor 77, a pump 76, a switching valve 73, a pressure accumulator 75, a slide group 72 and a hydraulic cylinder 71. Furthermore, the electrohydraulic system 70 for this purpose comprises an oil temperature sensor 151, an oil pressure sensor 152, an oil quality sensor 153, a vibration sensor 154, a structure-borne sound sensor 155 and further sensors 156.

As has been shown with reference to FIGS. 2 to 5, it is not important for the health monitoring according to the invention what type of actuator is to be monitored in terms of its status. The specific configuration of the actuator 30 is not decisive. Accordingly, the apparatus according to the invention also is conceivable with a rotatory electromechanical actuator or an electrohydrostatically supported actuator.

Figure 6:
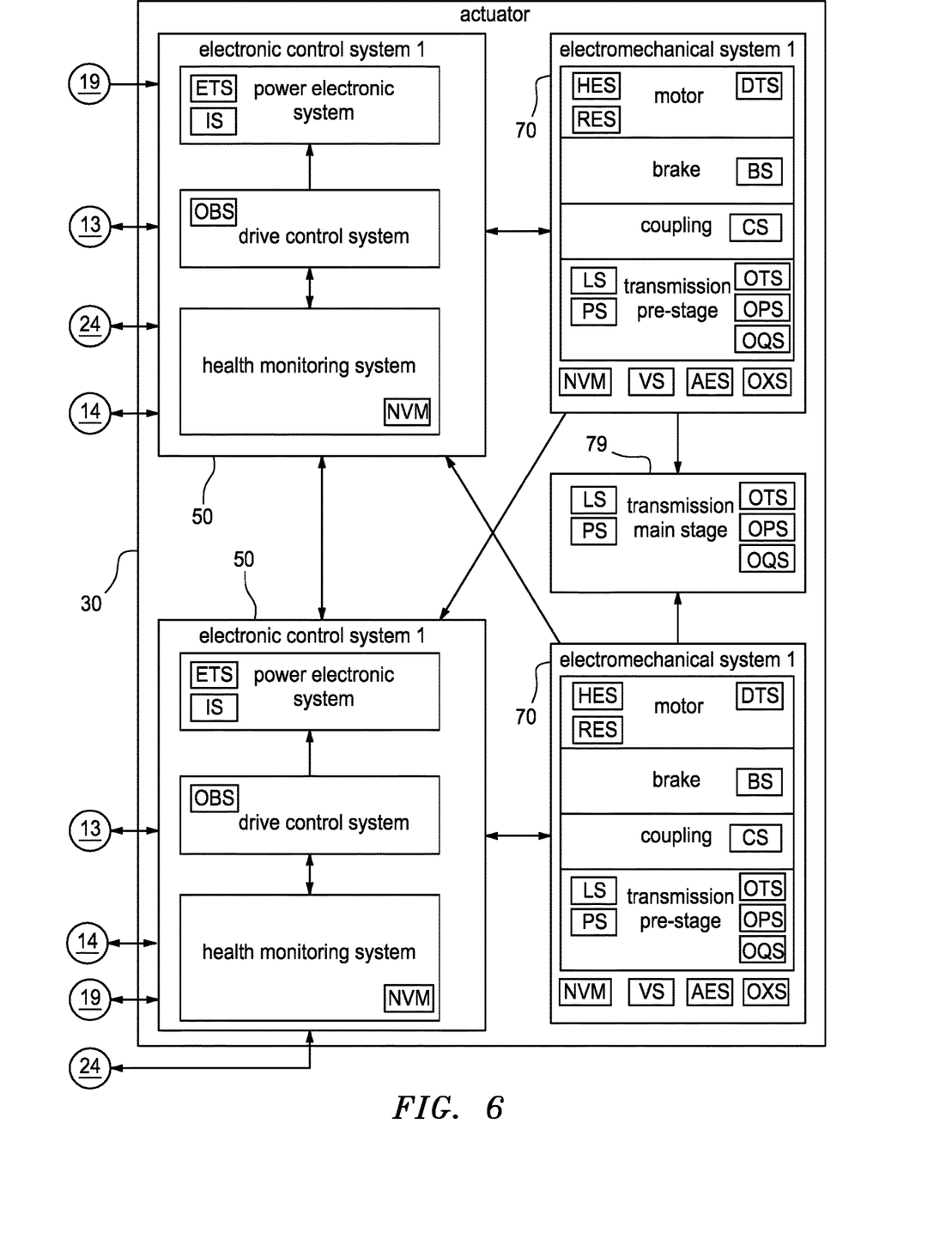
FIG. 6: shows the health monitoring interfaces to an electric drive for a high-lift system (E-PCU)

FIG. 6 shows the health monitoring interfaces to an electric drive which is typical for a high-lift system (E-PCU). The actuator 30 comprises two control electronic blocks 50 and two electromechanical systems 70. There is furthermore shown a main gear stage 79 which receives signals from the two blocks of the electromechanical system 70. In addition, each of the electromechanical blocks 70 includes a connection to each of the electronic control systems 50. The electronic control systems 50 also include a bidirectional communication line among each other. In general, there is hence shown a redundant configuration of the electronic control system 50 and the electromechanical system 70 required for actuating the main gear stage 79. As the health monitoring system is comprised by the electronic control system 50 or is realized on the processor of the same, it likewise is configured in duplicate.

Figure 7:
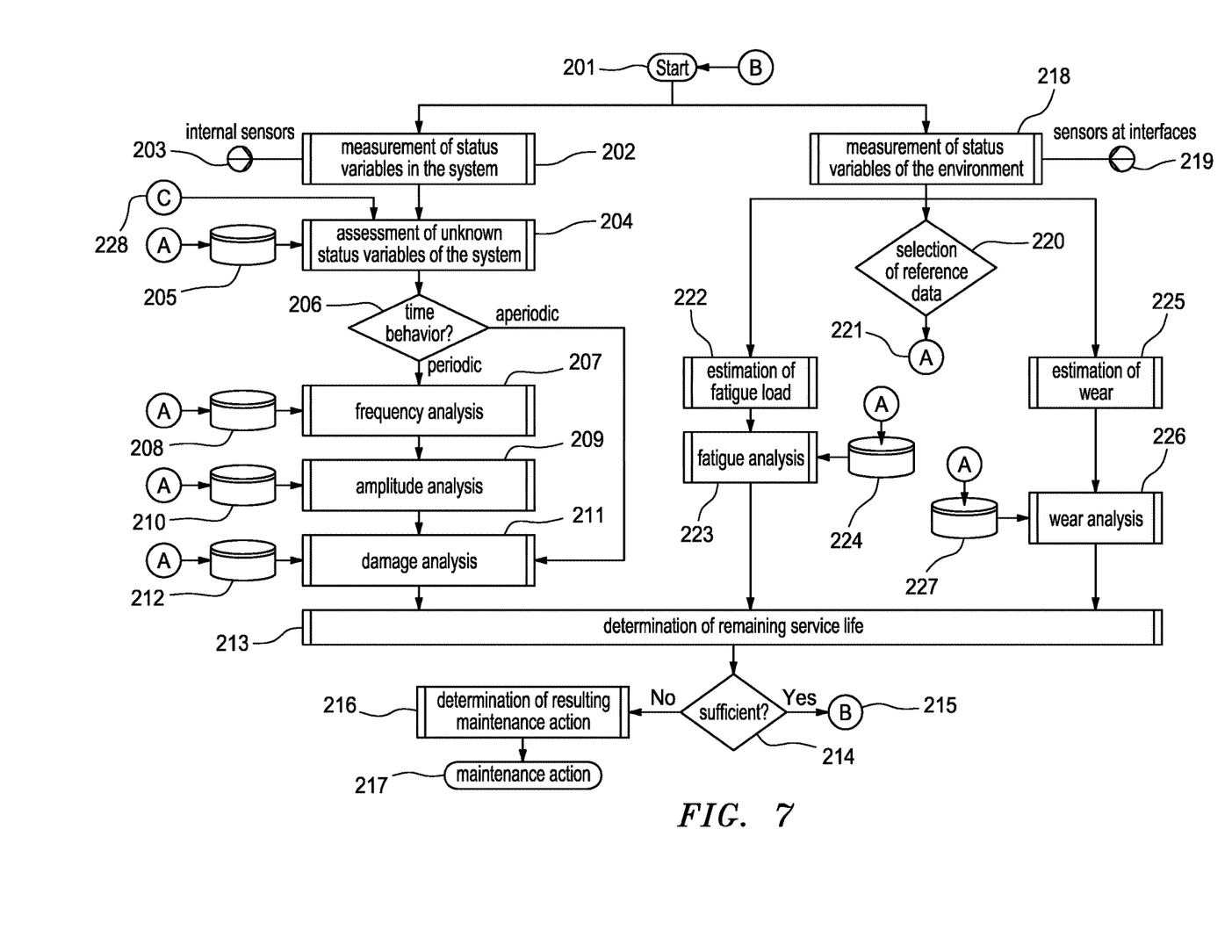
FIG. 7: shows a flow diagram for carrying out health monitoring according to the invention.

FIG. 7 shows a flow diagram for carrying out the health monitoring according to the invention. The program starts at the element designated with the reference numeral 201 and then splits up into two lines of action to be executed in parallel. Alternatively, these lines of action can however also be executed in a serial way. This is helpful for example in a less powerful processor unit for carrying out health monitoring. After the start of health monitoring, the status variables are measured in the system 202. There are used system-internal sensors 203. After measuring the status variables in the system, the unknown status variables of the system are assessed 204. The assessment here is made by falling back on reference data on the functional behavior 205 and on signals from the interface to the drive control system 228. Thereafter, it is attempted to recognize a specific time behavior 206. In the case of periodic unknown status variables of the system a frequency analysis 207, i.e. an analysis of the time behavior, is made. There are used reference data in the frequency range 208, which represent a known error in the frequency range. Thereafter, an amplitude analysis 209 is made, which also can be attained directly when upon recognition of a specific time behavior 206 periodic structures are recognized. In the amplitude analysis 209, too, reference data in the time range 210 are employed. After evaluation of these two analyses the damage analysis 211 is made, which likewise uses reference data on the damage behavior 212. The result of the damage analysis thus obtained then contributes to the determination of the remaining service life 213.

Parallel to this line of action since commencement of health monitoring there is a further line of action which will be explained below. After commencement of health monitoring, the status variables of the environment are measured 218 at interfaces 219 by means of sensors. With reference to this measurement the reference data used above are determined like the reference data on the functional behavior 205, the reference data in the frequency range 208, the reference data in the time range 209, and the reference data on the damage behavior 212 (cf. A). In addition, with reference to the measurement of status variables of the environment 218 the fatigue load is estimated 222. After estimating the fatigue load a fatigue analysis 223 is made on the basis of reference data on the fatigue behavior 224, wherein these reference data likewise have been chosen in dependence on the measurement of the status variable of the environment. The fatigue analysis 223 then like the damage analysis 211 contributes to the determination of the remaining service life 213. After measuring the status variables of the environment 218, there is also made an estimation of the wear 225 parallel to the estimation of the fatigue load 222 and to the selection of the reference data 220, in which an index of the reference data set 221 is determined. After estimation of the wear, a wear analysis 226 is made by using reference data on the wear behavior 227, which have been determined on the basis of the index of the reference data set 221. The results of the wear analysis 226 likewise are used for determining the remaining service life 213. With reference to the damage analysis 211, the fatigue analysis 223 and the wear analysis 226, the remaining service life then can be determined 213. Thereafter, it can be determined whether or not this determined remaining service life is sufficient 214.

If the service life is sufficiently high, i.e. exceeds a preset threshold value, the method again starts at 215. If it is detected that the service life falls below a threshold value, the maintenance action resulting therefrom is determined 216. In a final step, the maintenance action thus determined is initiated 217.

The invention claimed is:

1. An apparatus for health monitoring of a service life of an actuator (30) in a flying device, comprising:

a processor unit for processing data and for operating a system model of the actuator (30), at least one sensor for detecting a correcting variable of the actuator and furthermore comprising at least one additional sensor which generates at least one correcting variable for health monitoring, and a memory unit (54) in which characteristic data of the actuator (30) are stored, wherein the processor unit determines a service life value of the actuator based on the system model, the correcting variable of the actuator and the characteristic data of the memory unit, wherein the characteristic data stored in the memory unit (54) are data of at least one of damage, fatigue and wear of the actuator (30), Wherein the characteristic data are known from a design phase of the actuator and obtained in the course of an approval of the actuator, and wherein the characteristic data only consist of data which have not been generated for the purpose of health monitoring.

2. The apparatus according to claim 1, wherein the processor unit is the processor unit of an electronic control system (50) of the actuator (30) and is designed to perform the control of the actuator (30).

3. The apparatus according to claim 1, wherein the processor unit is designed to receive signals from at least one of a separate control system for driving the actuator (30), a communication with a superordinate computer (13, 14), and another actuator (30) connected in parallel with the actuator.

4. The apparatus according to claim 1, wherein the processor unit determines the service life value of the actuator to analyze the existing data with regard to an operating condition and an operational safety of the actuator (30), and determine the demand of at least one of maintenance measures, servicing measures, component replacement and device replacement.

5. The apparatus according to claim 2, wherein
the processor unit is designed to tap at least one real-time signal for controlling an actuator (30) or for detecting a correcting variable of an actuator (30) and convert the same into a particular number of characteristic quantities, wherein preferably the number of the data of the real-time signal is greater than the number of the data of the characteristic quantities, and
the processor unit is designed to store the characteristic quantities into the memory unit (54) for at least one of subsequent forwarding, further processing and evaluation.

6. The apparatus according to claim 1, wherein the memory unit (54) is a memory unit (54) for an electronic control system (50) of the actuator (30).

7. The apparatus according to claim 5, wherein
reference values for the characteristic quantities are stored in the memory unit (54), and
the processor unit compares one of the characteristic quantities with its associated reference value, wherein the reference values are generated in the course of a prior testing of the actuator (30).

8. The apparatus according to claim 1, wherein the processor unit determines a remaining service life and the status of the actuator (30) based on the service life value.

9. The apparatus according to claim 8, wherein the remaining service life and status of the actuator are not to be transmitted in real time to a superordinate maintenance computer (14) or the flying device personnel, so that existing interfaces (24) of an electronic control system (50) of the actuator (30) can be utilized to transmit information.

10. The apparatus according to claim 1, wherein the at least one additional sensor is at least one of a structure-borne sound sensor (155), a vibration sensor (154), an oil pressure sensor (152), an oil quality sensor (153) and an oil temperature sensor (151).

11. The apparatus according to claim 10, wherein the energy supply of the at least one additional sensor is effected by the conversion of at least one of device vibrations and of heat.

12. A method for health monitoring of a service life of an actuator (30) in a flying device with an apparatus according to claim 1, comprising steps:
- determining at least one of the correcting variable, reference variables and status variables from the control or regulation of a drive controller of the actuator (202, 218),
- determining characteristic quantities for at least one of damage, fatigue and wear analyses (211, 223, 226) based on at least one of the correcting variable, reference variables and status variables,
- determining the status of the actuator (213) based on the characteristic quantities, and
- deriving at least one of a required maintenance and servicing action based on the determined status of the actuator (216).

13. The method according to claim 12, wherein one or more of the steps are carried out in at least one of a flight computer (13) or a maintenance computer (14) of the flying device.

14. The method according to claim 12, wherein the method comprises health monitoring of the entire flight control around a flight axis or direction of movement in longitudinal axis, transverse axis and/or vertical axis.

15. The apparatus according to claim 2, wherein the processor unit is designed to receive signals from at least one of a separate control system for driving the actuator (30), a communication with a superordinate computer (13, 14), and another actuator (30) connected in parallel with the actuator.

16. The apparatus according to claim 1, wherein the processor unit determines the service life value of the actuator to analyze the existing data with regard to an operating condition and an operational safety of the actuator (30), and determine the demand of at least one of maintenance measures, servicing measures, component replacement and device replacement.

17. The method according to claim 12, wherein the determination of the characteristic quantities is based on a reduction of at least one of the correcting variable, the reference variables and the status variables.

* * * * *